United States Patent [19]
Uggla et al.

[11] Patent Number: 6,049,184
[45] Date of Patent: Apr. 11, 2000

[54] METHOD AND ARRANGEMENT FOR CONTROLLING A CURRENT

[75] Inventors: Dan J Uggla, Mossrosbacken; Rolf Wennergren, Åkervägen, both of Sweden

[73] Assignee: New Japan Radio Co., Ltd., Nihonbashi, Japan

[21] Appl. No.: 09/376,050

[22] Filed: Aug. 17, 1999

[30] Foreign Application Priority Data

Aug. 19, 1998 [SE] Sweden ................................... 9802768

[51] Int. Cl.⁷ .................................................. H02K 17/32
[52] U.S. Cl. .......................... 318/434; 318/685; 318/696; 318/254
[58] Field of Search ..................................... 318/365–367, 318/375–376, 379–380, 434, 759, 760, 685, 696, 254, 70, 280–300

[56] References Cited

U.S. PATENT DOCUMENTS

| | | | |
|---|---|---|---|
| 4,581,565 | 4/1986 | Van Pelt et al. | 318/294 |
| 5,343,382 | 8/1994 | Hale et al. | 363/98 |
| 5,372,045 | 12/1994 | Schulz et al. | 73/861.12 |
| 5,457,364 | 10/1995 | Bilotti et al. | 318/434 |
| 5,530,639 | 6/1996 | Schulz et al. | 363/17 |
| 5,650,705 | 7/1997 | Hart | 318/635 |
| 5,930,103 | 7/1999 | Heck | 361/187 |
| 5,986,418 | 11/1999 | Horst et al. | 318/254 |

*Primary Examiner*—Brian Sircus
*Assistant Examiner*—Rina I. Duda
*Attorney, Agent, or Firm*—Armstrong, Westerman, Hattori, McLeland & Naughton

[57] ABSTRACT

To control the current through a winding interconnected in an H-bridge to control e.g. a stepping motor, at the beginning of each chopper period, the H-bridge is kept in its slow demagnetization state during predetermined interval (t1–t2). Then, just before, at or just after the end of that interval, the actual current value (IA) is compared with a desired value (ID). If the actual value (IA) is smaller, the H-bridge is kept in its magnetization state, at the most until the end of the chopper period. If the actual value is larger, the H-bridge is kept in its fast demagnetization state, at the most until the end of the chopper period. Hereby, the current is regulated to the desired value with a minimum of current ripple. This reduces the electromagnetic radiation. Also, the impact of current spikes, appearing when the H-bridge is switched, is brought to a minimum.

8 Claims, 3 Drawing Sheets

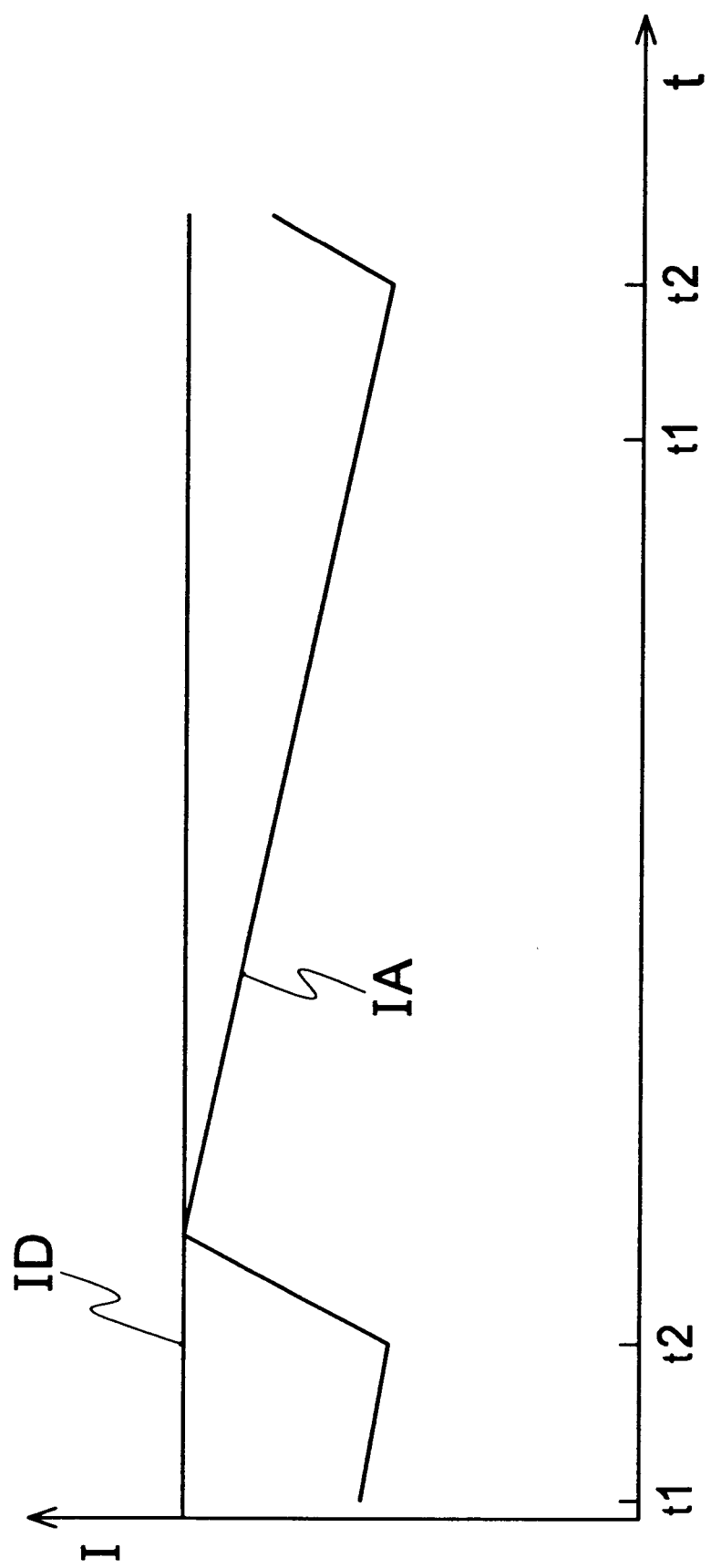

METHOD AND ARRANGEMENT FOR CONTROLLING A CURRENT

BACKGROUND OF THE INVENTION

The invention relates generally to current control and more specifically to a method and an arrangement for controlling a current through a winding interconnected in an H-bridge for controlling e.g. a stepping motor.

As is well known, in order to control the current through the winding to a desired value, such H-bridges are switched alternately during repetitive chopper periods among a magnetization state in which the winding is magnetized, a slow demagnetization state in which the winding is slowly demagnetized, and a fast demagnetization state in which the winding is quickly demagnetized.

If the desired value is constant or increasing, there are normally no problems to control the current to the desired value.

However, if the desired value decreases substantially, it is more difficult to control the current to the desired value.

A number of solutions to this problem are known.

The most common is to, in some way, sense whether the desired value increases or decreases. If the desired value decreases more than some specified criterion, the H-bridge is kept in the fast demagnetization state. Otherwise, it is kept in the slow demagnetization state. A disadvantage of this method is that a decision criterion for when fast demagnetization is to be used, has to be defined for each application and operational mode. This can be very time consuming. The method does not either solve resonance problems that arise when the actual value of the current oscillates.

According to another known method, an automatic choice is made between slow and fast demagnetization. In this case, a clock pulse is used, which always switches the H-bridge to the magnetization state. Just before, during or just after the switching of the H-bridge to the magnetization state, a comparison is made between the actual value and the desired value of the current through the winding. The result of this comparison controls in its turn whether fast or slow demagnetization is to be used after the magnetization phase. The actual value of the current through the winding increases during the magnetization phase. The actual value is compared to a desired value and when the actual value reaches the desired value, the H-bridge is switched to either the fast or the slow demagnetization state, the choice being controlled by the previous current comparison. The choice between the two demagnetization states can then be varied in accordance with a couple of different methods up to the next clock cycle when magnetization again is initiated.

The disadvantage of this method is that a relatively large current ripple is obtained due to the fact that there is a short period during each clock cycle when magnetization is carried out independent of both the actual value and the desired value. By also controlling the time during which fast demagnetization is used, the ripple can be improved to a certain extent by that method. However, a requirement is that it should be possible to measure the current through the winding irrespective of the state of the H-bridge. In practice, this is quite difficult since the current has to be measured in series with the winding. The potential in the point where the current measurement has to take place, varies strongly. Thus, this measurement method is rarely used.

As examples of the prior art, U.S. Pat. No. 4,908,562 and Swedish Patent Application No. 9800131-6 can be mentioned.

SUMMARY OF THE INVENTION

The object of the invention is to eliminate the problems of the prior art methods.

This is attained in accordance with the invention by, at the beginning of each chopper period, keeping the H-bridge in the slow demagnetization state during a predetermined interval. Then, just before, at or just after the end of that interval, the actual value of the current through the winding is compared with a desired value. If the actual value is smaller than the desired value, the H-bridge is kept in the magnetization state after said predetermined interval, at the most until the end of the chopper period. On the other hand, if the actual value is larger than the desired value, the H-bridge is kept in the fast demagnetization state after said predetermined interval, at the most until the end of the chopper period.

The current through the winding can easily be measured as a voltage over a sense resistor which is connected between the H-bridge and ground in a manner known per se.

By controlling the bridge in such a manner that it never tries to increase the current when the actual value of the current is higher than the desired value and vice versa, the current ripple is brought to a minimum. Also, the electromagnetic noise produced by the winding is reduced to a minimum.

When the H-bridge changes state, a current spike originating from electric charges stored in recirculation diodes of the H-bridge, will inevitably pass through the sense resistor. The switching sequence of the H-bridge is controlled in such a manner that such spikes do not interfere with the current regulation. This will increase the accuracy and speed of the current regulation.

The switching of the H-bridge between slow and fast demagnetization states is made automatically and is based on the difference between the actual and the desired values of the current through the winding. Hereby, resonance problems are reduced when the actual value of the current oscillates.

The switching of the H-bridge is easily controlled. Thus, no time consuming evaluation of the application is needed to optimize its performance.

BRIEF EXPLANATION OF THE DRAWINGS

The invention will be described more in detail below with reference to the appended drawings, on which:

FIG. 2 is a diagram illustrating how the current through the winding is controlled when the desired value of the current is constant.

DETAILED DESCRIPTION

Figure 1A:
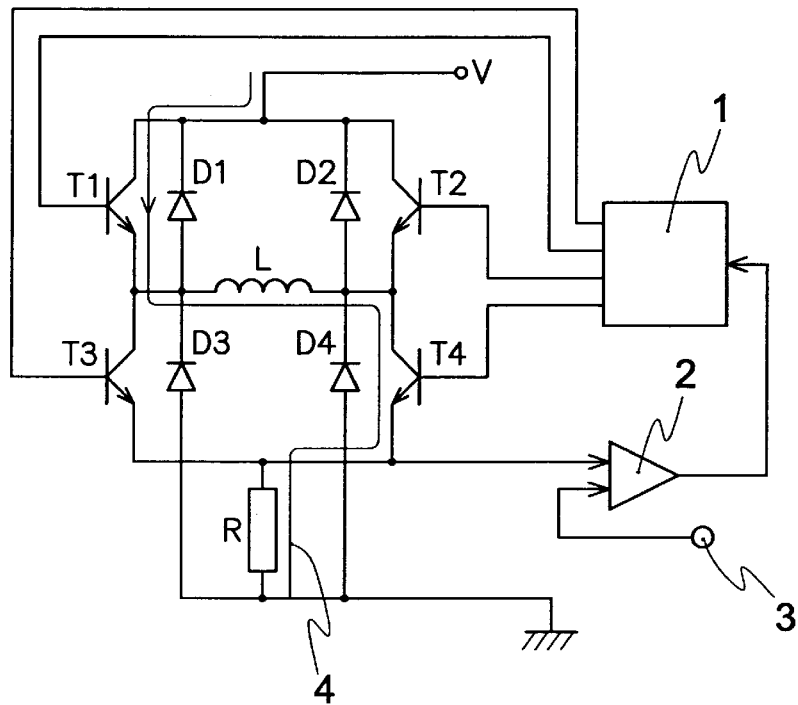
FIGS. 1(a) to 1(c) illustrate current flows through a winding in a H-bridge in three different states of the H-bridge.
Figure 1B:
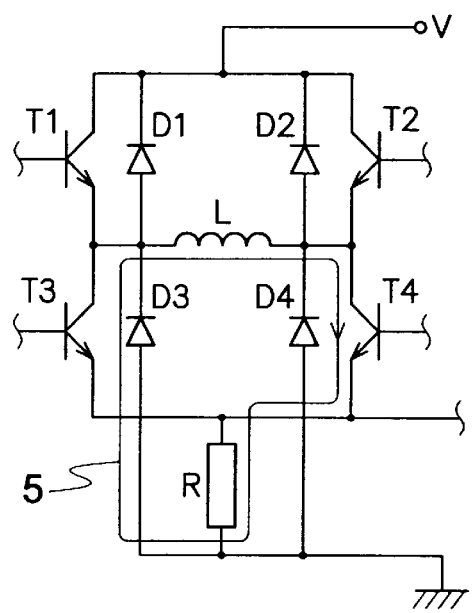
Figure 1C:
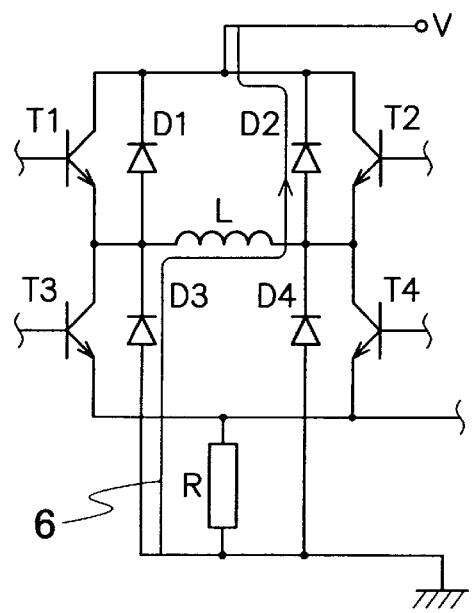

FIGS. 1(a) to 1(c) illustrate current flows through a winding L in a known H-bridge in three different states of the H-bridge. Even if the H-bridge can further be switched to other states, these three states only are used in accordance with the invention.

In a manner known per se, the H-bridge shown in FIGS. 1(a) to 1(c) comprises four transistors T1, T2, T3 and T4. The collector of the transistor T1 is interconnected with the collector of the transistor T2 and the interconnection point is connected to a voltage terminal V. The bases of the transistors T1 and T2 are each connected to an output terminal of a control circuit 1.

The emitters of the transistors T1 and T2 are interconnected with the collectors of the transistors T3 and T4, respectively, and the winding L is interconnected between the interconnection points.

The emitters of the transistors T3 and T4 are interconnected, and the interconnection point is connected to ground via a resistor R.

The bases of the transistors T3 and T4 are also connected to individual output terminals of the control circuit 1.

A recirculation diode D1 is interconnected between the collector of the transistor T1 and the interconnection point between the emitter of the transistor T1 and the collector of the transistor T3.

In a similar manner, a recirculation diode D2 is interconnected between the collector of the transistor T2 and the interconnection point between the emitter of the transistor T2 and the collector of the transistor T4.

A recirculation diode D3 is interconnected between the interconnection point between the emitter of the transistor T1 and the collector of the transistor T3 and ground.

In a similar manner, a recirculation diode D4 is interconnected between the interconnection point between the emitter of the transistor T2 and collector of the transistor T4 and ground.

A comparator 2 is connected via a blanking circuit or a low pass filter (not shown) to the interconnection point between the emitters of the transistors T3 and T4 to sense the voltage across the resistor R, and convert that voltage into a value of the current through the resistor R, i.e. the actual value of the current through the winding L, and compare it with a desired value supplied to the comparator 2 via an input terminal 3 of the comparator 2 in a manner known per se from e.g. a motor control unit (not shown). The comparator 2 informs the control circuit 1 about the result of the comparison via an output terminal connected to an input terminal of the control circuit 1.

The purpose of the blanking circuit or low pass filter (not shown) is to eliminate the current spike that always occurs across resistor R when the H-bridge changes state. The origin of the current spike is mainly electric charges stored in the recirculation diodes D1, D2, D3 and D4. A minor current spike occurs from electric charges stored in the capacitance between collector and emitter of the transistors T1, T2, T3 and T4 and the capacitance of the winding.

The switching sequence in accordance with the invention is started in such a manner that no current spike, originating from the recirculation diodes, is produced across the resistor R when the H-bridge enters its magnetization state and starts to regulate the actual current through the winding to the desired value. This makes it possible to use a much shorter blanking time of the blanking circuit (not shown) or a low pass filter (not shown) having a larger bandwith. This will in turn increase the accuracy and speed in the current regulation.

FIG. 1(a) illustrates the case when the H-bridge is in the state when the winding L is magnetized. In this magnetization state of the H-bridge, the transistor T1 and T4 are on under control by the control circuit 1. Thus, current will flow through the transistor T1, the winding L, the transistor T4 and the resistor R to ground as schematically indicated by a solid line 4 in FIG. 1(a). The magnetization current, i.e. the actual current through the winding L, is sensed as a voltage across the resistor R.

In FIGS. 1(b) and 1(c), the control circuitry for the H-bridge is not shown.

FIG. 1(b) illustrates the case when the H-bridge is in the state when the winding L is slowly demagnetized. In this slow demagnetization state, the transistor T4 is on under control by the control circuit 1 as illustrated in FIG. 1(a). Thus, the demagnetization current will flow from the winding L, through the transistor T4, the resistor R, and the recirculation diode D3 back to the winding L as illustrated by means of a solid line 5 in FIG. 1(b). As in FIG. 1(a) the actual current through the winding L, i.e. in this case the demagnetization current, is sensed by the comparator 2 in FIG. 1(a) as a voltage across the resistor R.

In this slow demagnetization state, one transistor should be on. One of the transistors closest to the resistor R should be chosen. In FIG. 1(b) the transistor T4 was chosen to be on by the control circuit 1 in FIG. 1(a). However, the transistor T3 could equally well have been chosen to be on. In that case, the current would flow in the opposite direction, i.e. from the winding L, through the transistor T3, the resistor R and the recirculation diode D4 back to the winding L.

FIG. 1(c) illustrates the case when the H-bridge is in the state when the winding L is quickly demagnetized. In this fast demagnetization state, none of the transistors T1–T4 is on. In this state, current will flow through the recirculation diode D3, the winding L and the recirculation diode D2 as illustrated by means of a solid line 6 in FIG. 1(c). The actual current, i.e. the current flow as represented by the solid line 6, can not be sensed across the resistor R in this case.

In accordance with the invention, the H-bridge is switched, during repetitive chopper periods, between the different states, as illustrated in FIGS. 1(a) to 1(c) to control the value of the actual current through the winding L in respect of a desired current value that may vary, and that is supplied to the input terminal 3 of the comparator 2 from e.g. a motor control unit as mentioned above.

FIG. 2 illustrates the case when the desired value ID of the current through the winding L, is supposed to be constant. It should be pointed out that FIG. 2 is valid also when the desired value ID is increasing.

In accordance with the invention, at the beginning of each chopper period, i.e. at a time t1, the H-bridge, by means of the control circuit 1, is always controlled to its slow demagnetization state as represented by FIG. 1(b), and is kept in this state for a predetermined period of time ending at a time t2 as shown in FIG. 2. In this state of the H-bridge, the actual value IA of the current through the winding L will decrease slowly as apparent from FIG. 2.

In view of the fact that quite a large current spike originating from charges stored in the recirculation diodes, will occur across the resistor R when the H-bridge goes from its fast demagnetization state, as illustrated in FIG. 1(c), to its slow demagnetization state, as illustrated in FIG. 1(b), the time t1–t2 should be longer than the length of this current spike. Thereby, that inevitable current spike will not interfere with the current regulation.

Just before, at or just after the end of the predetermined interval t1–t2, i.e. around the time t2, the actual value IA of the current through the winding L sensed across the resistor R by the comparator 2, is compared with the desired value ID supplied to the comparator via the input terminal 3.

In FIG. 2, the actual value IA of the current through the winding L is supposed to be smaller than the desired value ID.

This is detected by the comparator 2 which informs the control circuit 1 accordingly.

In this case, the control circuit 1 brings the H-bridge to the magnetization state as represented by FIG. 1(*a*), and keeps it in that state after the predetermined interval, i.e. after the time t2, at the most until the end of the chopper period in question, i.e. until the next time t1.

However, if the actual value IA reaches the desired value ID during the rest of the chopper period in question, as in FIG. 2, this is detected by the comparator 2. The comparator 2 informs the control circuit 1 accordingly, and the control circuit 1 brings the H-bridge again to its slow demagnetization state for the rest of the chopper period, i.e. to the next time t1.

When the next chopper period starts at time t1, since the H-bridge already is in its slow demagnetization state in FIG. 2, it will stay in that state until after the next time t2.

Should the H-bridge for some reason be in its magnetization state when the next chopper period starts at the next time t1, in accordance with the invention as above, the H-bridge will be brought by the control circuit 1 to the slow demagnetization state at the beginning of that next chopper period, i.e. at said next time t1.

Figure 3:
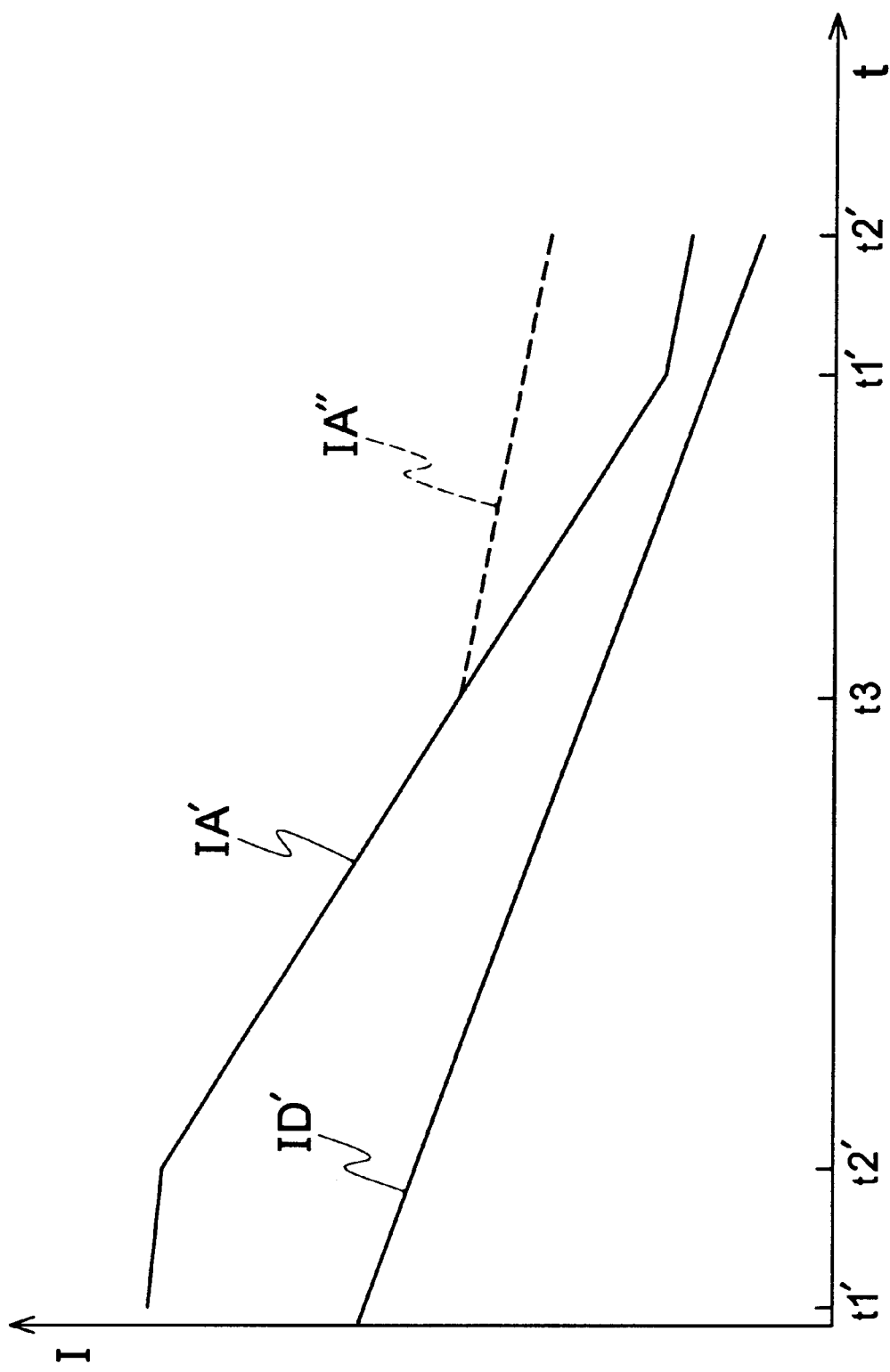
FIG. 3 is a diagram illustrating how the current through the winding is controlled when the desired value of the current decreases substantially.

FIG. 3 illustrates the case when the desired value of the current through the winding L decreases substantially, and the actual value is larger than the desired value. In FIG. 3, the desired value is denoted ID' and the actual value is denoted IA'.

As in FIG. 2, and in accordance with the invention, at the beginning of each chopper period, in FIG. 3 at times t1', the control circuit 1 brings the H-bridge to the slow demagnetization state as represented by FIG. 1(*b*), and keeps it in that state during a predetermined period of time, in FIG. 3 until time t2'.

Just before, at or just after the end of that predetermined period of time, i.e. around time t2', the comparator 2 compares the actual value IA' of the current through the winding L, as calculated from the voltage sensed across the resistor R, with the desired value ID', as supplied via the input terminal 3 from e.g. a motor control unit, and detects that the actual value IA' is larger than the desired value ID'.

Then, the comparator 2 informs the control circuit 1 accordingly and the control circuit 1 brings the H-bridge to the fast demagnetization state as represented by FIG. 1(*c*) at time t2', and keeps the H-bridge in that fast demagnetization state, at the most until the end of the chopper period in question, i.e. to the next time t1'.

Normally, as illustrated in FIG. 3, the H-bridge will be kept in its fast demagnetization state until the beginning of the next chopper period, i.e. the next time t1', when the H-bridge again is brought to the slow demagnetization state until the next time t2'.

However, in order to avoid too quick a demagnetization of the winding L and thereby also restrict the current ripple, the H-bridge may be kept in its fast demagnetization state only for a second predetermined period of time, e.g. from time t2' until a time t3 as illustrated in FIG. 3. From that time t3 until the end of the chopper period at time t1', the H-bridge is kept in its slow demagnetization state, as indicated in FIG. 3 by a broken line IA".

The time t3 could be either fixed or controlled e.g. from the difference between the actual and desired values of the current. Namely, as is illustrated in relation to FIG. 2, t3 could be so controlled as to be a time when the actual value of the current reaches the desired value. Also in this case, the longest time of t3 is limited within the rest of the chopper period, i.e. by the next time t1', in accordance with the control rule of the invention.

To sum up, by always starting the chopper period with the H-bridge in its slow demagnetization state for a predetermined time, has two main advantages.

First, the large current spike originating from the recirculation diodes, will not interfere with the current regulation. Thereby, the current can be regulated to the desired value with higher speed and accuracy.

Second, the H-bridge is switched between its slow and its fast demagnetization states only if the desired value of the current through the winding is lower than the actual value, and is switched between its slow demagnetization state and its magnetization state only when the desired value of the current through the winding is higher than the actual value. Hereby, the current ripple and the electromagnetic noise will be reduced to a minimum.

What is claimed is:

1. A method of controlling a current through a winding interconnected in an H-bridge by switching the H-bridge, during repetitive chopper periods, between a magnetization state, a slow demagnetization state, and a fast demagnetization state, characterized by the following steps during each chopper period:

at the beginning of each chopper period, keeping the H-bridge in the slow demagnetization state during a predetermined interval (t1–t2, t1'–t2');

comparing the actual value of the current through the winding with desired value;

if the actual value is smaller than the desired value, keeping the H-bridge in the magnetization state after said predetermined interval (t1–t2), at the most until the end of the chopper period;

if the actual value is larger than the desired value, keeping the H-bridge in the fast demagnetization state after said predetermined interval (t1'–t2'), at the most until the end of the chopper period.

2. The method of claim 1, characterized by comparing the actual value with the desired value just before, at or just after the end of said predetermined interval (t1–t2, t1'–t2').

3. The method of claim 1, characterized by the step of keeping the H-bridge in the magnetization state only until the actual value equals the desired value during the chopper period after said predetermined interval (t1–t2), if the actual value is smaller than the desired value when compared, and thereafter keeping the H-bridge in the slow demagnetization state for the rest of the chopper period.

4. The method of claim 1, characterized by the step of keeping the H-bridge in the fast demagnetization state only for a predetermined period of time (t2'–t3) after said predetermined interval (t1'–t2'), if the actual value is larger than the desired value when compared, and thereafter keep the H-bridge in the slow demagnetization state for the rest of the chopper period.

5. An arrangement for controlling a current through a winding (L) interconnected in an H-bridge switchable, during repetitive chopper periods, between a magnetization state, a slow demagnetization state, and a fast demagnetization state, characterized in that a control circuit (1) is adapted, at the beginning of each chopper period, to keep the H-bridge in the slow demagnetization state during a predetermined interval (t1–t2, t1'–t2');

that a comparator (2) is adapted to compare the actual value (IA; IA') of the current through the winding (L)

with a desired value (ID; ID'), and to inform the control circuit (1) accordingly;

that, if the actual value (IA) is smaller than the desired value (ID), the control circuit (1) is adapted to keep the H-bridge in the magnetization state after said predetermined interval (t1–t2), at the most until the end of the chopper period, and that, if the actual value (IA') is larger than the desired value (ID'), the control circuit (1) is adapted to keep the H-bridge in the fast demagnetization state after said predetermined interval (t1'–t2'), at the most until the end of the chopper period.

6. The arrangement of claim 5, characterized in that the comparator (2) is adapted to compare the actual value with the desired value just before, at or just after the end of said predetermined interval (t1–t2; t1'–t2').

7. The arrangement of claim 5, characterized in that the control circuit (1) is adapted to keep the H-bridge in the magnetization state only until the actual value (IA) equals the desired value (ID) during the chopper period after said predetermined interval (t1–t2), if the actual value (IA) is smaller than the desired value (ID) when compared, and thereafter keep the H-bridge in the slow demagnetization state for the rest of the chopper period.

8. The arrangement of claim 5, characterized in that the control circuit (1) is adapted to keep the H-bridge in the fast demagnetization state only for a predetermined period of time (t2'–t3) after aid predetermined interval (t1'–t2'), if the actual value (IA') is larger than the desired value (ID') when compared, and thereafter keep the H-bridge in the slow demagnetization state for the rest of the chopper period.

* * * * *